United States Patent
Westermann et al.

(10) Patent No.: US 7,784,849 B2
(45) Date of Patent: Aug. 31, 2010

(54) CONVERTIBLE VEHICLE WITH A ROOF COMPRISING SEVERAL ROOF SECTIONS

(75) Inventors: Manfred Westermann, Osnabrück (DE); Jürgen Theuerkauf, Bramsche (DE)

(73) Assignee: Wilhelm Karmann GmbH, Osnabrueck (DE)

( * ) Notice: Subject to any disclaimer, the term of this patent is extended or adjusted under 35 U.S.C. 154(b) by 269 days.

(21) Appl. No.: 11/840,403

(22) Filed: Aug. 17, 2007

(65) Prior Publication Data
US 2008/0093880 A1 Apr. 24, 2008

(30) Foreign Application Priority Data
Aug. 17, 2006 (DE) .......................... 10 2006 038 769

(51) Int. Cl.
*B60J 7/14* (2006.01)
(52) U.S. Cl. ............. 296/107.17; 296/213; 296/146.14
(58) Field of Classification Search ............ 296/107.07, 296/146.14, 108, 213
See application file for complete search history.

(56) References Cited

U.S. PATENT DOCUMENTS

| | | | | |
|---|---|---|---|---|
| 3,536,354 | A | * | 10/1970 | Ingram ........................ 296/147 |
| 6,641,202 | B2 | * | 11/2003 | Graf et al. ................ 296/107.04 |
| 6,729,672 | B2 | * | 5/2004 | Neubrand ............... 296/107.07 |
| 6,866,324 | B2 | | 3/2005 | Neubrand et al. |
| 7,100,963 | B2 | * | 9/2006 | Queveau et al. ............. 296/108 |
| 2005/0184554 | A1 | | 8/2005 | Queveau et al. |
| 2008/0203758 | A1 | * | 8/2008 | Brockhoff ............... 296/107.07 |

FOREIGN PATENT DOCUMENTS

| | | |
|---|---|---|
| DE | 19635869 C1 | 1/1998 |
| DE | 199 36 252 C2 | 8/2001 |
| DE | 102 31 838 A1 | 2/2004 |
| DE | 102004025051 A1 | 12/2005 |
| DE | 10 2005 005 237 B3 | 8/2006 |
| EP | 1647431 A2 | 4/2006 |
| WO | 2006066537 A1 | 6/2006 |

\* cited by examiner

*Primary Examiner*—Joseph D Pape
(74) *Attorney, Agent, or Firm*—Quinn Law Group, PLLC

(57) ABSTRACT

A convertible vehicle with at least two successive roof sections that are separated on their exterior surface at a groove when the roof is closed, with a rear roof section being displaceable rearwards and downwards for the opening of the roof and a roof section arranged in front of it being movable towards the rear roof section. The rear roof section, being divided into a central section and externally located frame parts, is designed in such a way that the forward roof section is supported by the central section and the frame parts are appended in the groove area and can be lifted during the opening of the roof from a common plane with the central section in such a way that the frame parts are dislocated rearwards and, at least in parts, downward opposite the central section when the roof is open.

22 Claims, 11 Drawing Sheets

CONVERTIBLE VEHICLE WITH A ROOF COMPRISING SEVERAL ROOF SECTIONS

CROSS REFERENCE TO RELATED APPLICATION

This application claims the benefit of German Patent Application No. DE 10 2006 038 769.4, filed Aug. 17, 2006, and which is hereby incorporated by reference in its entirety.

TECHNICAL FIELD

The invention relates to a convertible vehicle with a rear roof section divided at least into a frame section and a central area 1, as well as an appurtenant vehicle roof.

BACKGROUND OF THE INVENTION

Convertible vehicles have been known that feature several roof sections arranged behind each other in closed state, a rear one of which is movable against the body around a transversal axle in such a way that it is essentially horizontal when taken down, with the side that faces the passenger compartment when the roof is closed facing upward.

DE 199 36 252 C2 shows such a vehicle in which the rear roof section is divided at the frames of the rear window and the exterior frame parts are a component of a four-articulation mechanism. The central section together with the rear window is upwardly movable via a rotatable control stick while the roof is being opened. This leads during the opening of the roof and when the roof is open to only the exterior frame sections, at that location formed as C columns, providing support for the forward roof section which, for example, may be essentially made of glass or which may comprise several plate bodies that are movable against each other, and thus having a considerable weight. Therefore, a mounting only via the lateral C columns will lead to an unstable support, with swaying movements of the roof around the longitudinal axes of the vehicle during the opening and closing phases, making the formation of transversal bracings necessary and thereby increasing the weight. The uplifted rear window itself can no longer contribute to a bracing action in this position. In addition, there is a connecting articulation positioned deep in the groove section which therefore may pose a danger of injury to passengers or reduce their headroom.

It is further known to turn the rear window against the lateral frame parts during the opening of the roof. However, in addition to the aforementioned difficulties, this will result in an additional weather stripping problem: the rear window, for example, must be pressed from below against a partial weather stripping above its horizontal rotation axis, and below the pivot against another partial weather stripping from above.

SUMMARY OF THE INVENTION

The invention provides an improved roof support by dividing the rear roof section into at least one central section and lateral frame parts.

With this invention, the frame sections lying laterally on the exterior are released from having to provide a support function. The latter is provided only by the central area of the rear roof section. Given the considerable width of such a support for the forward roof section, the stability of the roof is improved, and swaying movements around the longitudinal axes of the vehicle are minimized. By loosely attaching the frame parts, they themselves may be made very light, for example of plastic. Also, it is possible to lift the frame sections upward, relative to the central area, by means of a component from the flush plane towards the central section, making it possible to move them out from the lateral shanks of a water channel reaching below the central section without any weather proofing problem at an upward incline.

It is particularly advantageous when the central section, together with its lower end when the roof is closed, is attached to the body in rotatable fashion around a first axle lying transverse to the vehicle and the forward roof part is attached to the upper end of the central section in movable fashion against the rear roof section around a second axle lying parallel to the first axle. The upper axis can then be located high up, without having to be held by separate arms and without restricting the headroom of passengers.

In that case, it is advantageous to provide a simple drive for the suspension of the frame parts so that they can be lifted out of the plane of the rear window, for example a simple double pendulum. In this case, a simple swing arm can be held in the groove area, while the frame section itself forms the lower lever of the double pendulum.

With such a drive, or a similar one, the frame sections can be compulsorily movable against the central section that provides the roof movement, without having their own drive, during the opening of the roof, meaning that at the end of the opening movements the frame sections can be displaced further downward and rearward against the merely pivoted central section, and that the remaining trunk space is thereby maximized.

If a common water channel is located below the frame parts and the central section from which the frame parts can be lifted with an upward component, a sealing problem is avoided that would require a force effect from various directions for sealing purposes. The water channel itself does not need to be divided in its transverse course—in contrast with the quoted state of the art—but may reach in one piece below the central section and the frame parts. This avoids in particular the problem, on the one hand, of needing to have the water run off to the exterior while, on the other hand, the water channel segments allocated to the frame parts would have to reach across the central section when the roof is closed.

Rather, in the design according to the invention, the water channel may be firmly attached to the central section and protrude from there in a transverse direction on the side, without having any disruption.

It is particularly advantageous if the frame parts are completely free of any supporting or even of a movement-conveying function for the forward roof section. The movement of the forward roof section while being supported by the rear roof section could then proceed in the same manner without the frame parts themselves. While the frame parts themselves may lie externally like C columns laterally to the rear window, they would not have to fulfill any additional functions apart from a sealing and covering one.

It is particularly advantageous that then the frame parts will be lying in their entire length externally on the central section in sealing fashion by which a disruption in the sealing line is avoided.

Additional advantages and characteristics of the invention can be gleaned from the demonstration models of the invention shown schematically in the drawing and described below.

DESCRIPTION OF THE PREFERRED EMBODIMENTS

Figure 1:
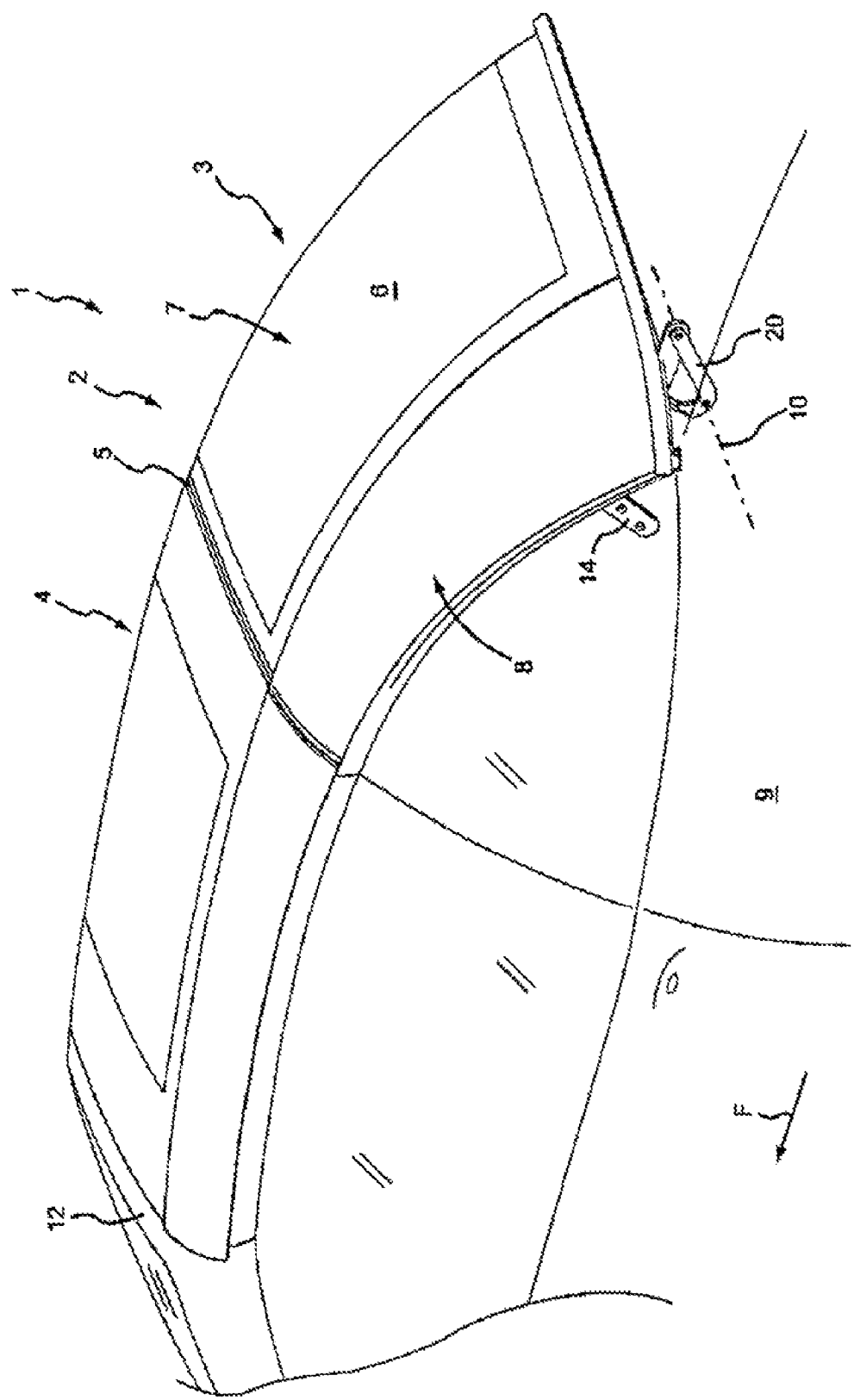
FIG. 1 is a schematic representation—cut off towards the front and below—of a convertible vehicle in accordance with the invention in a perspective view at an angle from behind, with the roof closed.
Figure 2:
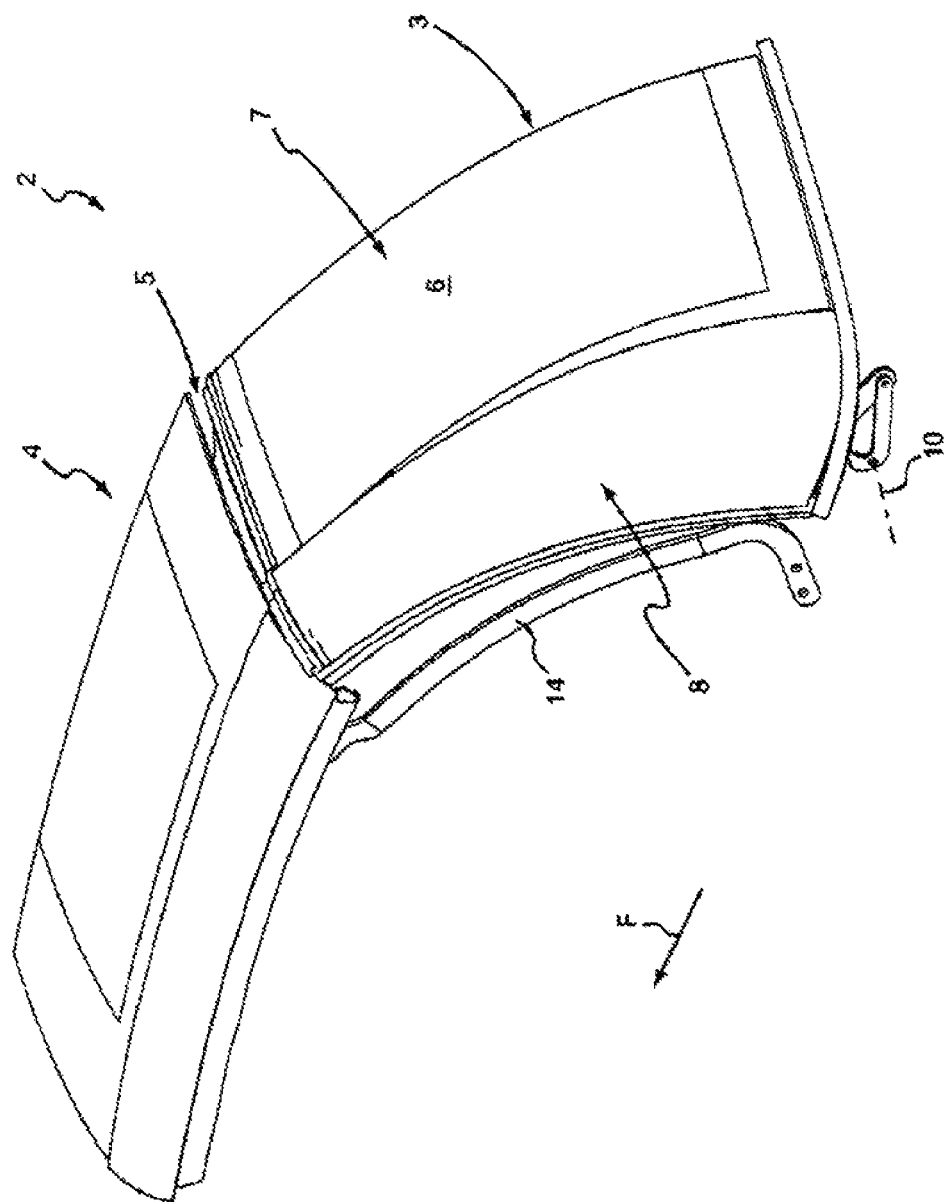
FIG. 2 is a view of the roof according to FIG. 1 during its start of the opening process and the lifting of the rear frame parts from the lower water channel.

According to the drawing, with the roof 2 closed, the convertible vehicle 1 according to the invention comprises two roof sections 3, 4 that are arranged one behind the other with regard to the direction of travel F and that are separated with regard to their exterior surface at a groove 5 that lies, at least for the most part, transversely to the vehicle. In particular the forward roof section 4 may in turn comprise several plate sections that are arranged one behind the other and that are movable against each other. The forward roof section 4 is located in front of the rear roof section 3 which here projects upward in closed position, and it lies almost horizontally. The roof sections 3, 4 are essentially formed of rigid parts and comprise at least rigid frames across which a cover may be stretched.

The rear roof part 3 is divided—relative to the transversal direction of the vehicle into at least a central section 7 which comprises a rear window 6, and external frame parts 8 that are arranged laterally therefrom and that are positioned next to the rear window 6, for example in the manner of C columns with the roof closed (FIG. 1), and that are movable relative to the central section 7 during the opening of the roof 2 (FIGS. 2 through 5, and/or FIGS. 7 through 10).

The rear window 6 may be foldable or, in particular, rigid and may be made, for example, of plastic or glass.

The convertible vehicle 1 may be a two-seater, but may also comprise a larger passenger compartment with two or more rows of seats arranged one behind the other.

Towards the roof opening, the rear roof section 3 can be moved rearward and downward, and the forward roof section 4 can be moved towards the rear roof section 3. The dislocation of the rear roof section 3 occurs here as a pure pivoting movement around a horizontal first axis of rotation 10 lying transversely to the direction of travel F of the vehicle 1, which axis 10 may be fixed in place relative to the body 9 or which may be movable during opening. The depositing movement may also be a superimposed movement with translatory and rotatory components on a circular path or other curves. In the demonstration model, this axis 10 is fixed in place relative to the body 9. In an open position (FIG. 5, FIG. 10), the interior side of the rear window 6 therefore looks essentially upward.

Here, too, the approaching swiveling movement of the forward roof section 4 towards the rear roof section 3 occurs as a pure pivoting movement around a second upper horizontal pivoting axis 11 that is movable together with the rear roof section 3.

The pivoting axis 10 links the body 9 to the central section 7 of the rear roof section 3; the pivoting axis 11 connects the central section 7 with the forward roof section 4.

Therefore, in addition to its support by the windshield frame 12, the forward roof section 4 is carried only by the central part 7 of the rear roof section 3.

The C column-like frame parts 8, on the other hand, are attached in the groove area. With the roof 2 closed, the frame parts 8 may lie flush with the plane of the rear window 6 with their exterior surface, which means that the fact that the rear roof part 3 is composed of several sections does not need to be visible.

Figure 5:
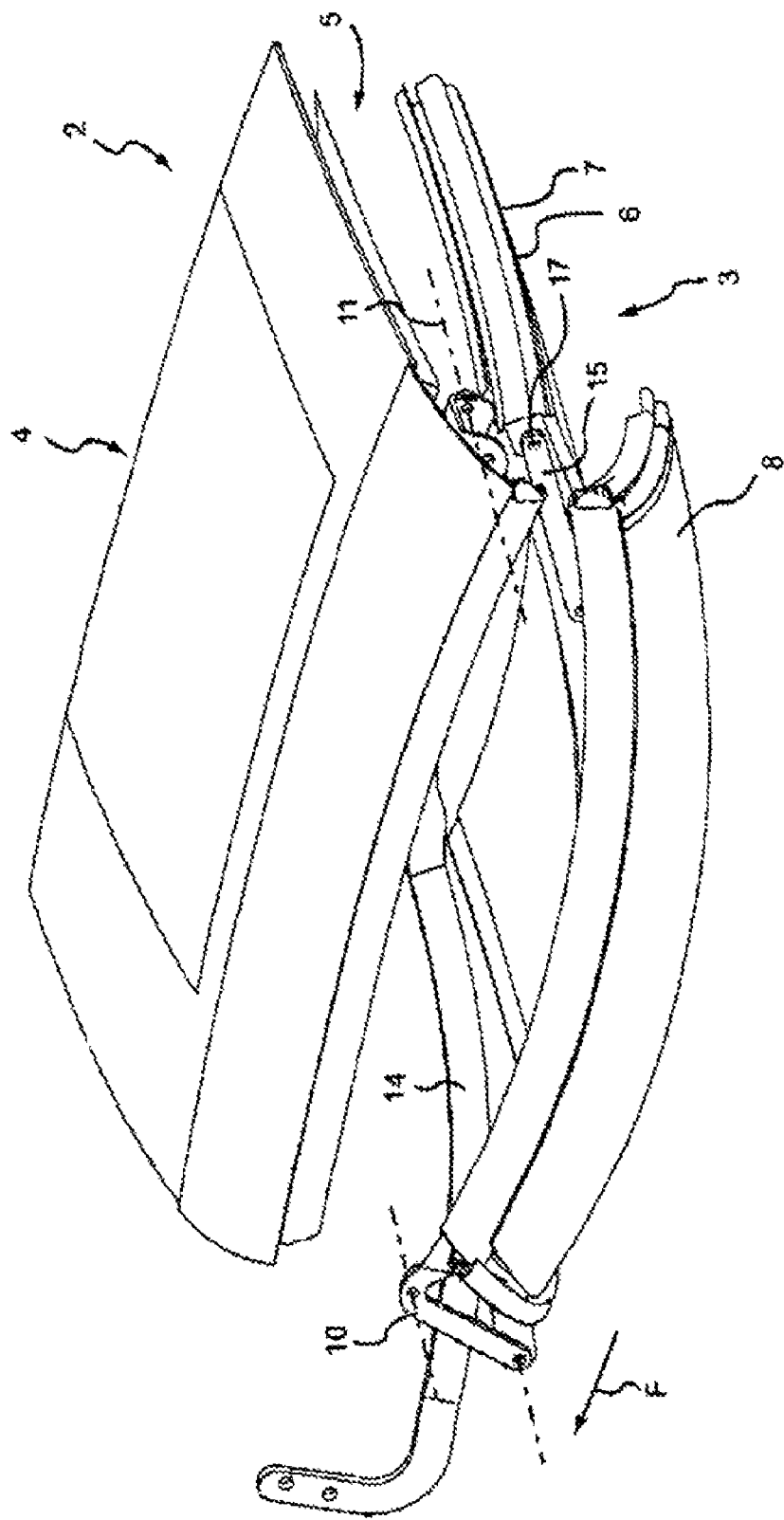
FIG. 5 is a similar view as FIG. 4 with a completely lowered roof in opening position.
Figure 6:
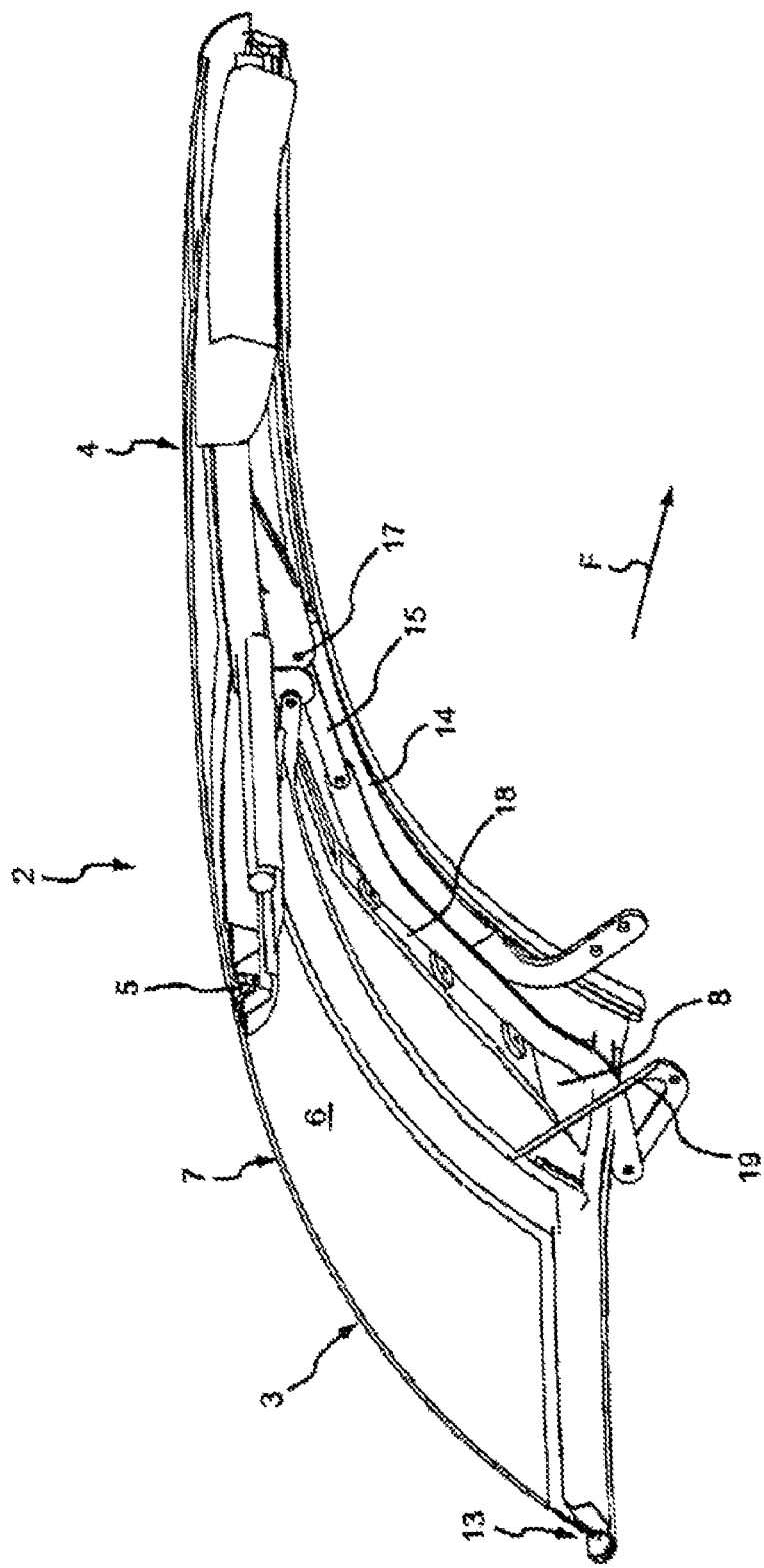
FIG. 6 is a view at an angle from inside into the left part of the closed roof in a position according to FIG. 1.
Figure 7:
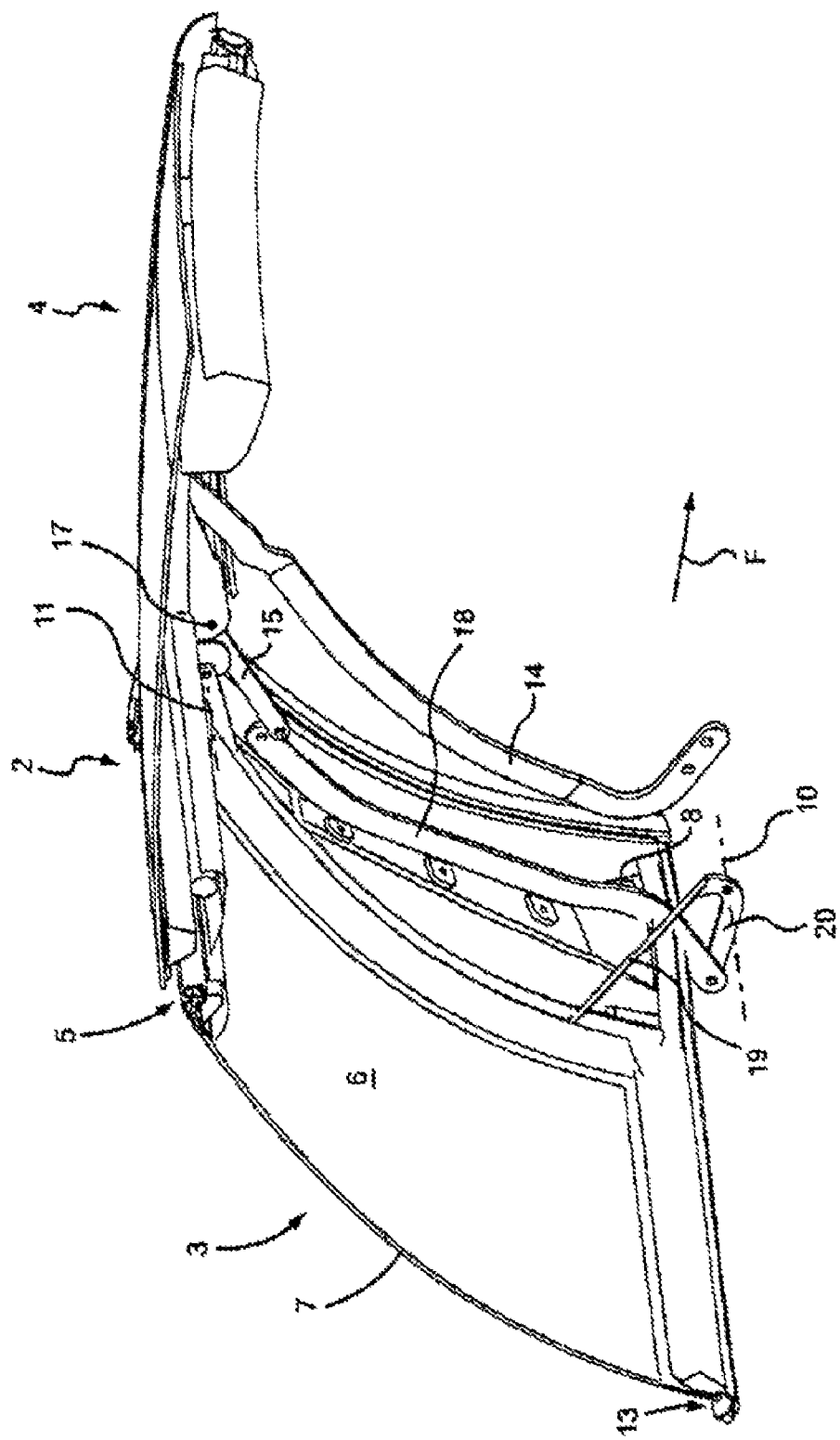
FIG. 7 is a similar view as FIG. 6 of the roof during the start of the opening process according to FIG. 2.
Figure 8:
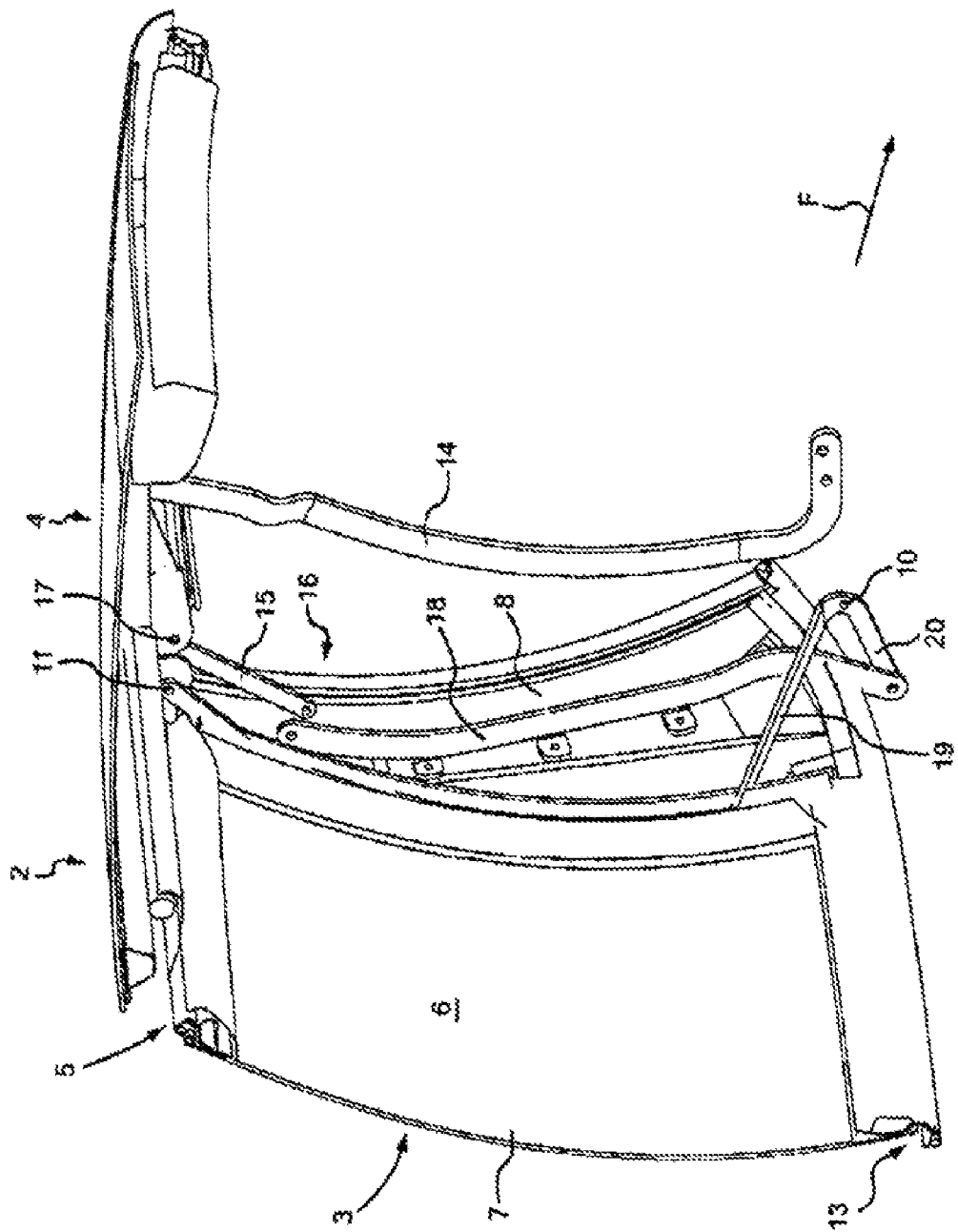
FIG. 8 is a similar view as FIG. 7 with progressive roof opening in accordance with FIG. 3.
Figure 9:
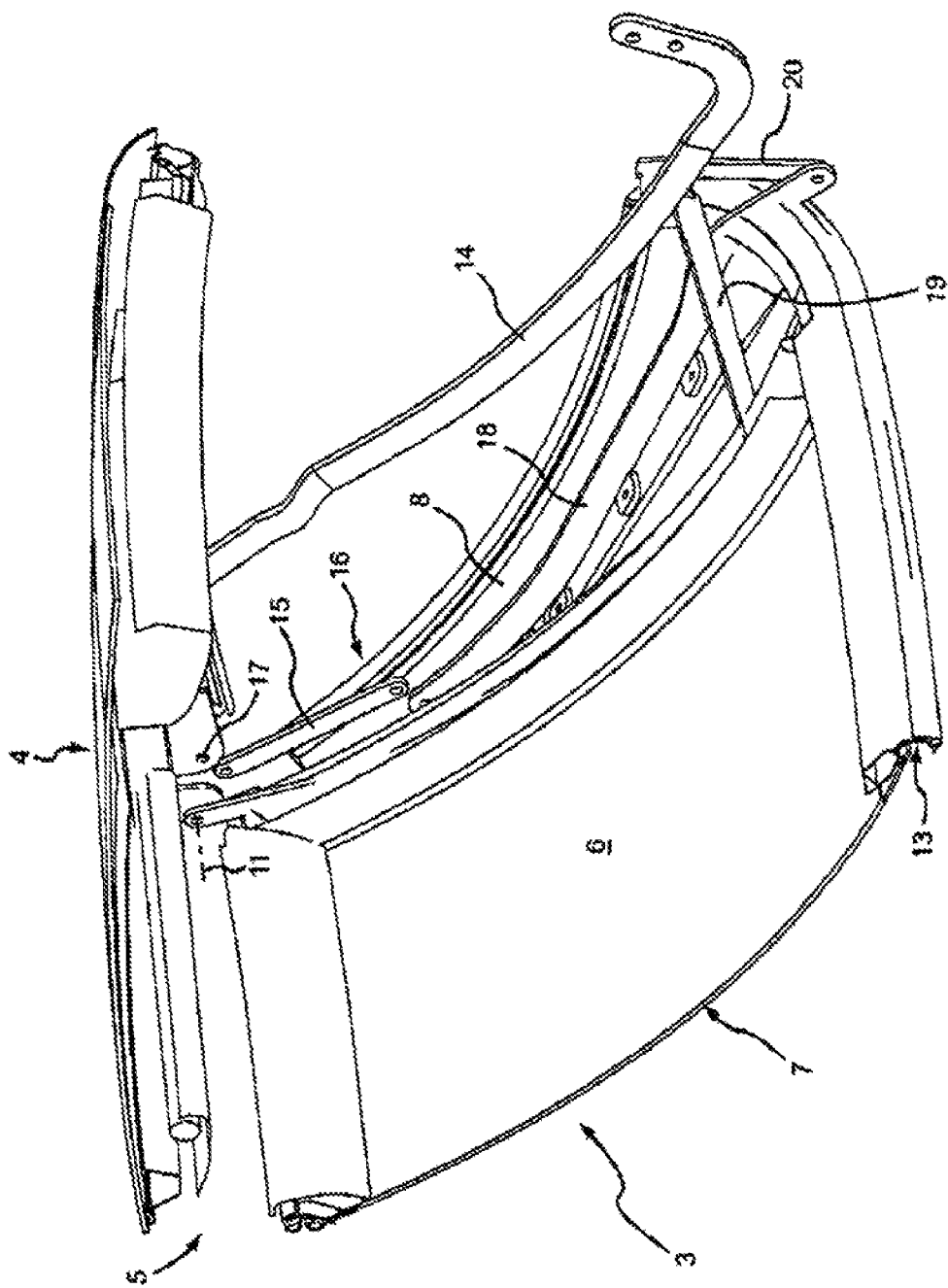
FIG. 9 is a similar view as FIG. 8 with a position of the roof in accordance with FIG. 4.
Figure 10:
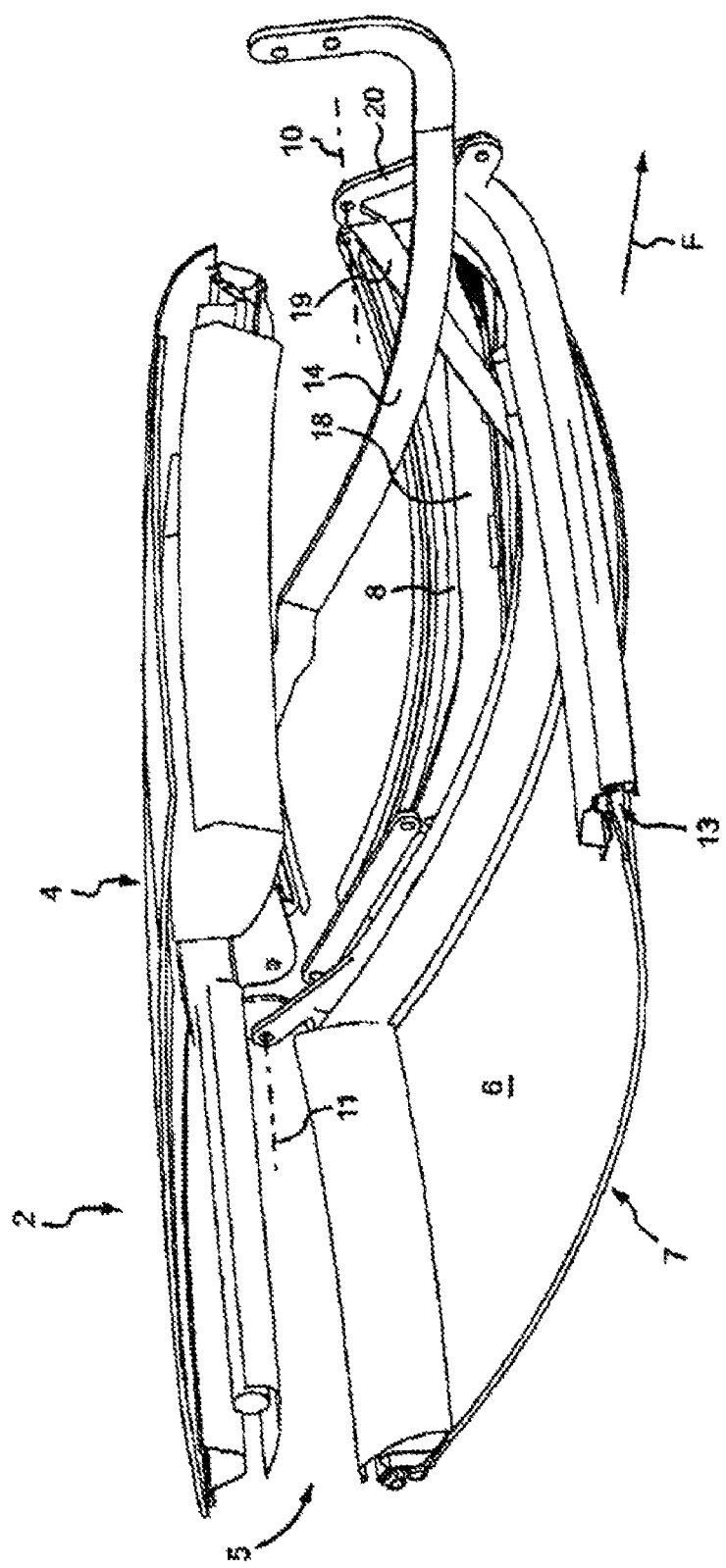
FIG. 10 is a similar view as FIG. 9 with a completely opened roof in accordance with FIG. 5.

During the opening of the roof 2, the frame parts 8 are lifted from their original common plane with the central section 7 in such a way that, with the roof 2 completely open, the frame parts 8 are then dislocated rearwards and downwards (at least in sections) against the central section 7 by means of the downward pivoting movement around the axis 10 (FIG. 5, FIG. 10).

Figure 3:
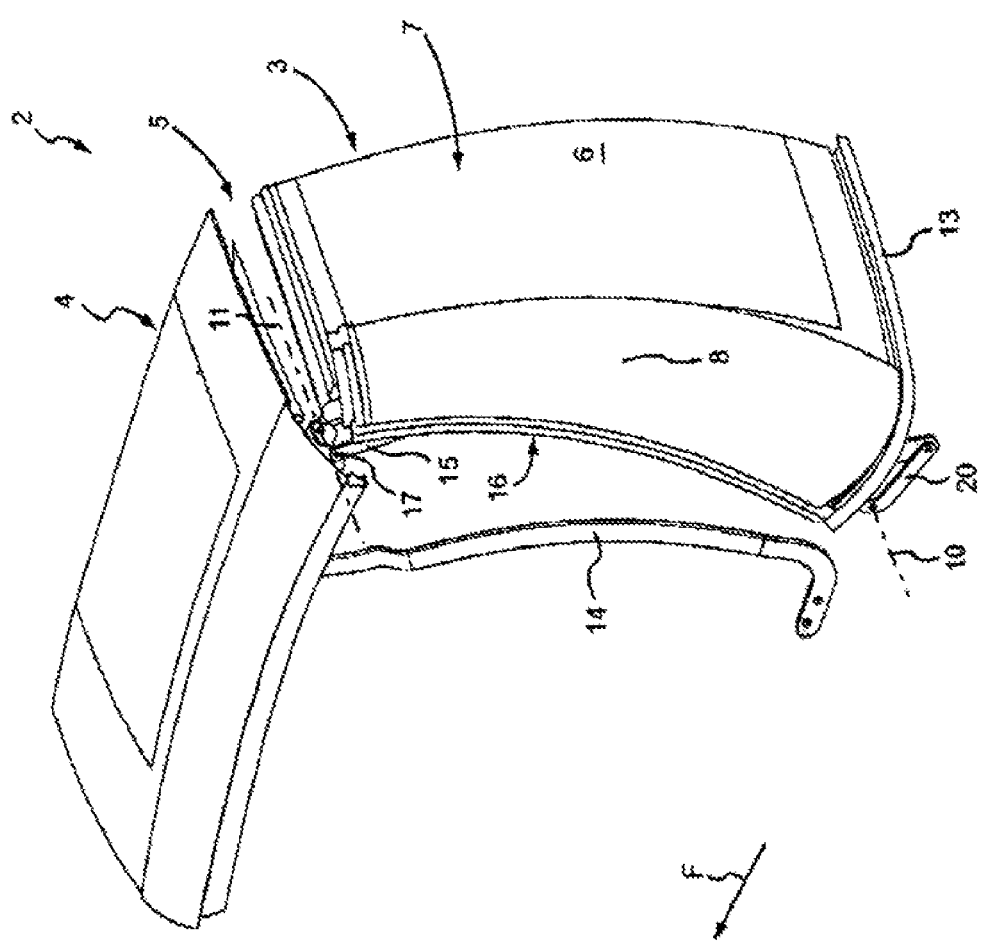
FIG. 3 is a similar view as FIG. 2, with progressing roof opening.
Figure 4:
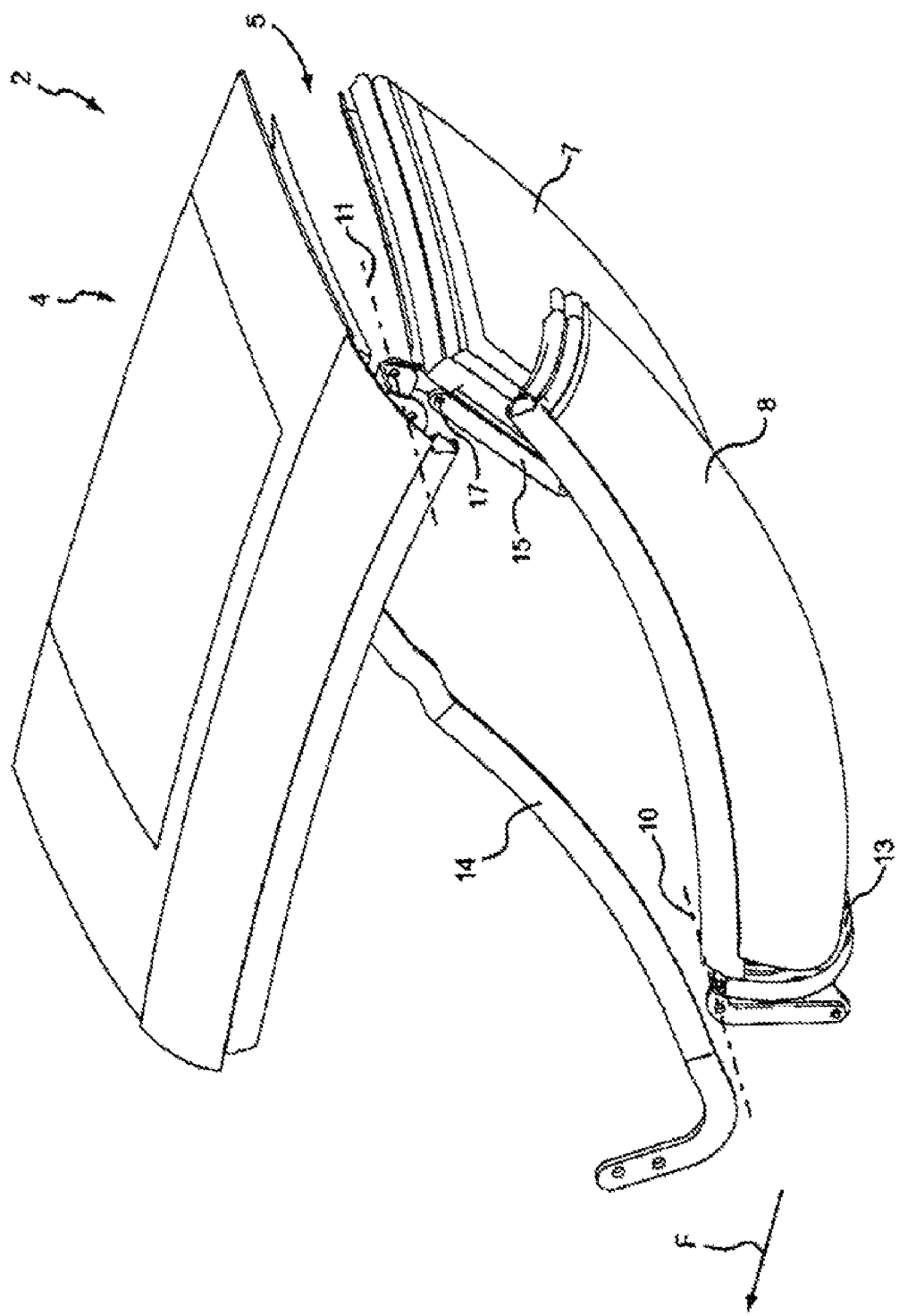
FIG. 4 is a similar view as FIG. 3, with a partially rotated position of the rear roof section and C columns lifted from the plane of the rear window.

With this type of movement of the frame parts 8, it is possible that a common water channel 13 is held below the latter and the central section 7 which may be in one piece and from which the frame parts 8 can be lifted by means of an upward component, indicated for example in FIG. 3. This simplifies the water management considerably. The water can flow off to the sides undisturbed. In particular, it will not be necessary that lateral sections of a water channel 13 would have to reach into a central section 7 from above, as is the case in the state of the art. Such a gradation is exactly counterproductive to the desired water flow-off to the sides and, under certain circumstances, will make an interim flow-off route from the water channel 13 necessary, which in turn means additional effort and costs.

In the demonstration model, the water channel 13 which is open at the top and shaped, for example, like a lying U is firmly attached to the central section 7, and from there protrudes transversely on the side. The lateral wings are adapted to the lower contour of the C column-like frame parts 8.

Alternatively, an allocation of the water channel 13 to the cover part of a cover container, not shown, would be possible.

In the drawn demonstration model, the central section 7 forms a rear main guidance rod of a pivoting parallelogram for the forward roof section 4. From the latter, a guidance rod 14 is provided at either side of the vehicle to complete the pivoting parallelogram almost parallel to the central section 7.

In their place, torsion shafts or similar could also be provided, for example, to convey the relative movement of the forward roof section 4 towards the central section 7 of the rear roof section 3.

Here, the movement of the forward roof section 4 is completely conveyable via the guidance rod 14 and the main guidance rod (i.e. central section) 7. Therefore, the frame parts 8 can not only be free of any load-bearing function but also free of a movement-conveying function for the forward roof section 4. The force transmission to the latter can then take place equally effectively without those frame parts 8.

In order to facilitate a very flat roof package and a roof rack as high as possible to maximize the remaining trunk space, the frame parts 8 that are strongly pulled inward can be deposited in a lower position in the trunk opposite the central section 7 together with the rear window 6. The trunk space is thereby maximized. Thus, there remains a considerable loading level in the central area, and the roof part package can be kept very flat.

For this option of a relative movement, the frame parts 8 are attached near the groove 5 of the rear roof section 3 via a drive 16 that conveys the lifting movement. Here, a double pendulum is formed as the driving mechanism. It comprises a swivel lever 15 that is also arranged, for example, on the upper pivot axis 11. For reasons of drawing techniques, the guidance 17 of the pivot lever 15 shifts during the roof movement which, however, does not need to happen in reality. It may also involve a fixed pivot guidance.

Figure 11:
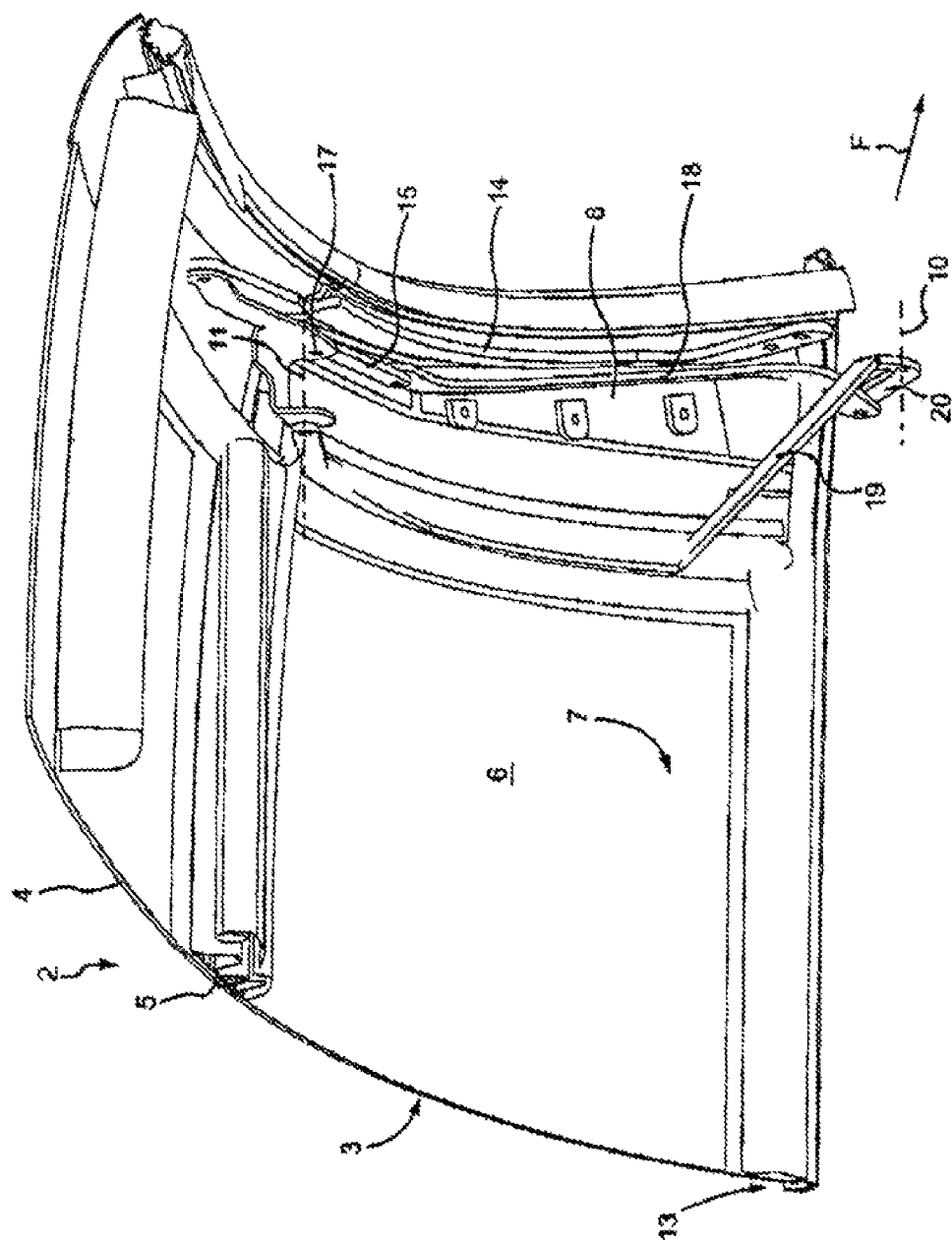
FIG. 11 is a similar view as FIG. 6 with the roof closed, from a slightly turned perspective, essentially looking backwards into the roof.

The lower lever of the double pendulum is formed by an insert 18 that is firmly connected to the frame part 8, with the insert 18 also being held in place on the lower pivot lever 20 for the central section 7 and being offset towards the outside in such a way that it supports a retaining fixture 19 for the central section 7 (FIG. 11).

This execution is only an example for a drive 16. To be advantageous, it is designed in such a way that during the opening of the roof 2 it effects compulsorily the relative movement of the frame parts 8 against the central section 7 without having a drive of its own. Therefore, no space is required for any further drives. In addition, the weight can be kept low.

Another advantage is connected with the invention, namely the fact that the lateral sealing lines, lying for example parallel to the lateral edges of the rear window 6, need not to be interrupted at the separation grooves of the central section 7; instead, the frame parts 8 may lie across their entire longitudinal extension in sealing fashion on the outside of the central section 7 when the roof 2 is closed (in the demonstration model shown here, the separation joints lie between the central section 7 and the frame parts 8, parallel to the edges of the rear window 6, which is not mandatory).

At the same time, the frame parts 8 and the central section 7 may jointly reach in sealing fashion below the forward roof section 4 from below with the roof 2 closed, meaning that no gradation is necessary in this horizontal sealing either and that the latter may be executed simply and effectively as, for example, a continuous rubber lip.

The entire movable roof 2 can be subjected to a functionality test prior to being installed in the body shell; the modular unit, thus preset and ready for use, can then be delivered to the body shell and be connected to it simply via lateral main bearings.

The invention can be used in vehicles with manually operated roofs as well as, in particular, in the case of fully or partially automated mobility of the roof 2.

While the best modes for carrying out the invention have been described in detail, those familiar with the art to which this invention relates will recognize various alternative designs and embodiments for practicing the invention within the scope of the appended claims.

The invention claimed is:

1. A convertible vehicle comprising:
a roof including at least two successive roof sections relative to a direction of travel, each of the roof sections having a respective exterior surface and each separated on the respective exterior surface at a groove when the roof is closed, the roof sections including a rear roof section being displaceable at least essentially rearwards and downwards for opening of the roof and a forward roof section arranged in front of the rear roof section and being movable towards the rear roof section; and the rear roof section being divided into a central section relative to the transverse direction of the vehicle, and frame parts disposed laterally adjacent the central section;
wherein the forward roof section is supported by the central section and the frame parts are supported near said groove and can be lifted, together with the central section, during the opening of the roof in such a way that, when the roof is open, the frame parts are dislocated rearwards and, at least in part, downwards against the central section.

2. A convertible vehicle according to claim 1;
wherein the central section has a lower end; and
wherein the central section, together with the lower end when the roof is closed, can be pivoted around a first axis extending at a right angle relative to the direction of travel of the vehicle, and that the forward roof section, disposed in front of the rear roof section, is linked to an upper end of the central section and can be pivoted around a second axis located parallel to the first axis, while the frame parts are supported near said groove via a drive that conveys a lift movement to open the roof.

3. A convertible vehicle according to claim 2, wherein the drive forms a double pendulum.

4. A convertible vehicle according to claim 3, wherein the drive, without having its own propulsion, effects compulsorily the relative movement of the frame parts against the central section when the roof is being opened.

5. A convertible vehicle according to claim 1, wherein a common water channel is located below the frame parts and the central section from which the frame parts can be lifted out of by means of an upward component.

6. A convertible vehicle according to claim 1, wherein the water channel is firmly linked to the central section and protrudes from there laterally.

7. A convertible vehicle according to claim 1, wherein the frame parts are free of any load-bearing or movement-conveying function for the forward roof section.

8. A convertible vehicle according to claim 1, wherein when the roof is closed, the frame parts are arranged in the manner of C columns next to the central section.

9. A convertible vehicle according to claim 1, wherein when the roof is closed, the frame parts are lying externally adjacent the central section in their entire length in sealing fashion.

10. A convertible vehicle according to claim 1, wherein when the roof is closed, the frame parts and the central section together reach under the forward roof section in sealing fashion.

11. A convertible vehicle according to claim 1, wherein the central section forms a rear main guidance rod of a pivot parallelogram for the forward roof section and the guidance rod is provided in generally parallel fashion on each side of the vehicle.

12. A movable vehicle roof comprising:
a roof including at least two successive roof sections relative to a direction of travel, each of the roof sections having a respective exterior surface and each separated on the respective exterior surface at a groove when the roof is closed, the roof sections having a rear roof section being displaceable at least essentially rearwards and downwards for opening of the roof and a forward roof section arranged in front of the rear roof section and being movable towards the rear roof section; and the rear roof section being divided into a central section relative to the transverse direction of the vehicle, and frame parts disposed laterally adjacent the central section;
wherein the forward roof section is supported by the central section and the frame parts are supported near said groove and can be lifted, together with the central section, during the opening of the roof in such a way that, when the roof is open, the frame parts are dislocated rearwards and, at least in part, downwards against the central section.

13. A movable vehicle roof according to claim 12;

wherein the central section has a lower end; and wherein the central section, together with the lower end when the roof is closed, can be pivoted around a first axis extending at a right angle relative to the direction of travel of the vehicle, and that the forward roof section, disposed in front of the rear roof section, is linked to an upper end of the central section and can be pivoted around a second axis located parallel to the first axis, while the frame parts are supported near said groove via a drive that conveys a lift movement to open the roof.

14. A movable vehicle roof according to claim 13, wherein the drive forms a double pendulum.

15. A movable vehicle roof according to claim 14, wherein the drive, without having its own propulsion, effects compulsorily the relative movement of the frame parts against the central section when the roof is being opened.

16. A movable vehicle roof according to claim 12, wherein a common water channel is located below the frame parts and the central section from which the frame parts can be lifted out of by means of an upward component.

17. A movable vehicle roof according to claim 12, wherein the water channel is firmly linked to the central section and protrudes from there laterally.

18. A movable vehicle roof according to claim 12, wherein the frame parts are free of any load-bearing or movement-conveying function for the forward roof section.

19. A movable vehicle roof according to claim 12, wherein when the roof is closed, the frame parts are arranged in the manner of C columns next to the central section.

20. A movable vehicle roof according to claim 12, wherein when the roof is closed, the frame parts are lying externally adjacent the central section in their entire length in sealing fashion.

21. A movable vehicle roof according to claim 12, wherein when the roof is closed, the frame parts and the central section together reach under the forward roof section in sealing fashion.

22. A convertible vehicle according to claim 1, wherein the central section forms a rear main guidance rod of a pivot parallelogram for the forward roof section and that the guidance rod is provided in generally parallel fashion on each side of the vehicle.

* * * * *